United States Patent [19]

Armstrong et al.

[11] 4,027,399

[45] June 7, 1977

[54] POSITIONAL SENSING

[75] Inventors: Robert James Armstrong; Boyd Stanley Cook, both of Bracknell, England

[73] Assignee: BP Trading Limited, London, England

[22] Filed: Jan. 7, 1976

[21] Appl. No.: 646,985

[30] Foreign Application Priority Data

Jan. 27, 1975 United Kingdom ............... 3494/75
Apr. 9, 1975 United Kingdom ............. 14513/75

[52] U.S. Cl. .................................... 33/366; 33/396
[51] Int. Cl.² ........................................ G01C 9/06
[58] Field of Search ................... 33/366, 346, 396

[56] References Cited

UNITED STATES PATENTS

| 1,109,008 | 9/1914 | Norton | 33/346 |
| 1,732,39 7 | 10/1929 | Braibant | 33/346 |
| 3,727,180 | 4/1973 | Lingel et al. | 33/366 |
| 3,861,052 | 1/1975 | Siegfried | 33/366 |
| 3,911,592 | 10/1975 | Crask | 33/366 X |

Primary Examiner—Charles E. Phillips
Attorney, Agent, or Firm—Morgan, Finnegan, Pine, Foley & Lee

[57] ABSTRACT

An angular positional sensor comprises a housing in which is mounted a rotary sensing device including a shaft which mounts a pendulum having relatively low inertia and a balanced member having relatively high inertia and rotatably mounted within the housing adjacent the pendulum member. At least the part of the housing containing the pendulum and the balanced member also contains a liquid to provide a viscous coupling between the pendulum and the balanced member. The arrangement is such, that in use, angular movement of the housing about the longitudinal axis of the shaft causes movement of the rotary sensing device relative to the shaft which is retained stationary by the pendulum which in turn is damped by the balanced member, to produce a signal representative of such angular movement from the rotary sensing device.

17 Claims, 5 Drawing Figures

POSITIONAL SENSING

The invention relates to angular positional sensors, more particularly, although not exclusively, to sensors for use in determining the deflection of a riser pipe during underwater drilling.

According to one aspect of the invention there is provided an angular positional sensor comprising a housing in which is mounted a rotary sensing device having a freely rotatable shaft carrying a pendulum, the arrangement being such, that in use, angular movement of the housing about the longitudinal axis of said shaft causes movement of the rotary sensing device relative to its shaft, which is retained stationary by the pendulum, to produce a signal representative of such angular movement from the rotary sensing device.

According to a further aspect of the invention an angular positional sensor comprises a housing in which is mounted a rotary sensing device including a shaft which mounts a pendulum having relatively low inertia and a balanced member having relatively high inertia and rotatably mounted within the housing adjacent the pendulum, at least the part of the housing containing the pendulum and the balanced member also containing a liquid to provide a viscous coupling between the pendulum and the balanced member and the arrangement being such, that in use, angular movement of the housing about the longitudinal axis of the shaft causes movement of the rotary sensing device relative to the shaft which is retained stationary by the pendulum which in turn is damped by the balanced member, to produce a signal representative of such angular movement from the rotary sensing device.

The ratio of the inertia of the balanced member to the inertia of the pendulum should be as high as possible such as in the order of 40:1. The pendulosity of the pendulum is preferably 50 gram centimeters minimum, or sufficient to overcome the bearing breakaway frictional torque within the angular accuracy allowance.

Conveniently, the pendulum is cylindrical and has a closed end by which it is mounted coaxially on the shaft of the rotary sensing device with a weight being attached thereto. With such a pendulum, the balanced member is also cylindrical, having a closed end by which it is mounted coaxially with the pendulum and the shaft of the rotary sensing device, the open end of the balanced member interfitting with the open end of the pendulum. The open ends of the pendulum and balanced members may each be formed or carry, coaxial with said shaft, cylindrical formations or members which are interfitting to increase the viscous coupling between the pendulum and balanced member.

The part of the housing containing the pendulum and balanced member may be completely filled with liquid, and a relatively small proportion may be removed, and the ratio of the spacing between the radially outer surface of the balanced member and a surrounding inner surface of the housing, on the one hand, and between the radially inner surface of the balanced member and the radially outer surface of the pendulum, on the other hand, may be of the order of 12:1 or more.

The housing may be substantially filled with liquid which may be a silicone fluid, with a member of closed cell, cellular synthetic plastics material, e.g. neoprene, also located in the housing to facilitate expansion of the liquid with increase of temperature.

The rotary sensing device may comprise a rotary A.C. inductive pick-off.

According to a still further aspect of the invention a positional sensing module comprises an outer casing containing two angular positional sensors as defined in any of the next preceding seven paragraphs located within the outer casing with the axes of rotation of said shafts normal to one another.

The outer casing may also be substantially filled with liquid, which may be a silicone fluid, with a member of closed cell, cellular synthetic plastics material, e.g. neoprene, also located in the casing to facilitate expansion of the liquid with increase in temperature.

According to yet a further aspect of the invention an angular positional sensing system comprises at least two positional sensing modules each connected via respective resolvers and demodulators to indicator means.

The indicator means may comprise a cathode ray tube display device. In addition or alternatively the demodulators may be connected via an attenuator and an arithmetic unit for operating audible and/or visible warning devices.

According to yet a still further aspect of the invention, a method of monitoring the deflection from vertical or a riser during underwater drilling comprises locating a separate angular positional sensing module, as defined hereinabove at a required position on the riser and at the top of the BOP stack, and comparing the outputs from such positional sensing modules to define the deflection angle in the ball or flexible joint between the riser and BOP stack.

The foregoing and further features of the invention may be more readily understood from the following description of two preferred embodiments thereof, by way of example, with reference to the accompanying drawings, in which.

Figure 1A:
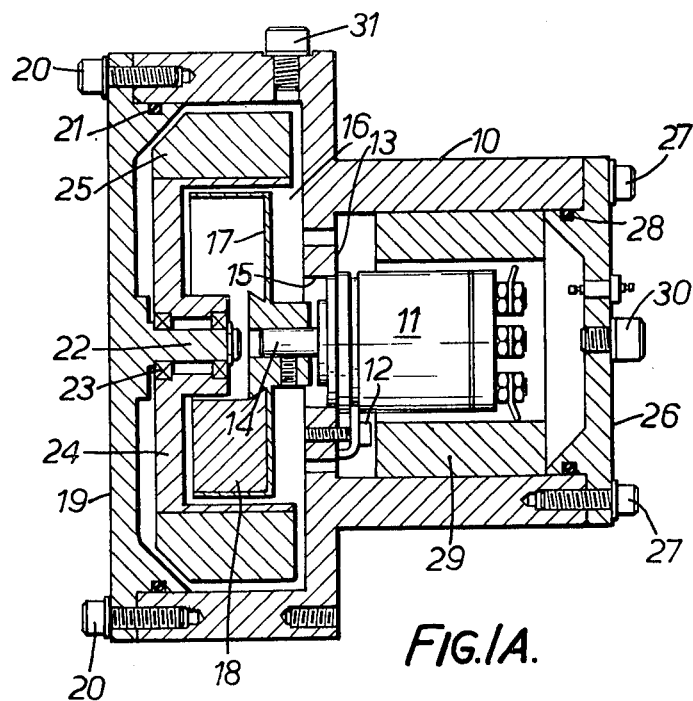
FIG. 1A is a side sectional view of a positional sensor.

Referring firstly to FIG. 1A there is shown a positional sensor comprising a generally T-shaped section housing 10 with a sensing device 11 comprising a rotary A.C. inductive pick-off located with its body housed in the hollow leg of the housing 10. The device 11 is attached by screws 12 to an interior wall 13 of housing 10 with a sensing shaft 14 projecting through an aperture 15 in wall 13 and into a hollow body 16 of housing 10. A light weight cylindrical pendulum member 17, carrying at least one weight 18 on its radially inner surface, is rigidly mounted on, and coaxially with shaft 14 for rotation therewith by way of a closed end of the member 17. The pendulum is arranged to have a pendulosity of 50 gram centimeters.

The hollow body 16 is closed by a circular end cap 19 retained by screws 20 and sealed by an O-ring seal 21. The end cap 19 is formed with an inwardly projecting, central nose portion 22 which carries deep grooved, instrument quality, bearings 23 for rotatably mounting a balanced member comprising a wheel 24 coaxially with the pendulum 17 and shaft 14. The wheel 24 carries a relatively heavy annular weight 25 such that there is an inertia ratio of the order of 40:1 between the wheel 24 and pendulum 17. The wheel 24 is both statically and dynamically balanced and fits over the pendulum 17.

The hollow leg of housing 10 is closed by an end cap 26, retained by screws 27 and sealed by an O-ring seal 28. A tubular member 29 of closed cell, cellular synthetic plastics material, such as neoprene, is located in the hollow leg of housing 10.

The interior of housing 10 is filled with a liquid, such as a silicone fluid, by initially locating end cap 19 horizontal and introducing liquid through an aperture subsequently closed by screw 30 in end cap 26. The housing 10 is then rotated to the position shown in FIG. 1 when a screw 31 is removed to bleed any entrapped air from hollow body 16; such body is then filled with the liquid. The tubular member 29 allows for expansion of the liquid with increase of temperature.

The internal diameter of wheel 24, where it surrounds pendulum 17, is slightly larger than the external diameter of the pendulum 17, e.g. 1 millimeter larger for a device with a pendulum 17 having an external diameter of 60 millimeters. The external diameter of weight 25 is such that the gap between it and the inner surface of the wall of housing 10 is about 12 times, i.e. 12 millimeters, that of the gap between pendulum 17 and wheel 24.

In use, when the housing 10 is tilted about the longitudinal axis of shaft 14 the sensing device 11 moves with the housing 10 but the pendulum 17 remains vertical. Hence there is rotation of device 11 relative to its shaft 14 and a corresponding electrical output is produced from device 11. The sensor is articularly suitable for use in environments such as for sensing the deviation from vertical of a riser used in underwater drilling. In such an environment there is considerable vibration and therefore the pendulum 17 is required to be damped so as to minimise the effects of such vibrations which might otherwise cause the pendulum to oscillate. This is achieved by the provision of the inertial wheel 24, the particular parameters of the pendulum 17 and wheel 24 referred to, and the silicone fluid. When the housing is tilted about the longitudinal axis of the shaft 14 the combined effects of the high inertia wheel, its low friction bearings, and light viscous couple to the case allows the inertia wheel to remain stationary. The high viscous couple between the wheel 25 and pendulum 17 assists the pendulum to remain vertical. The pendulum is, of course, sensitive to laterally applied accelerations such as those due to drilling. The effects of these are minimised by the high viscous couple with the inertial wheel 24 which does not react to such conditions.

Figure 1B:
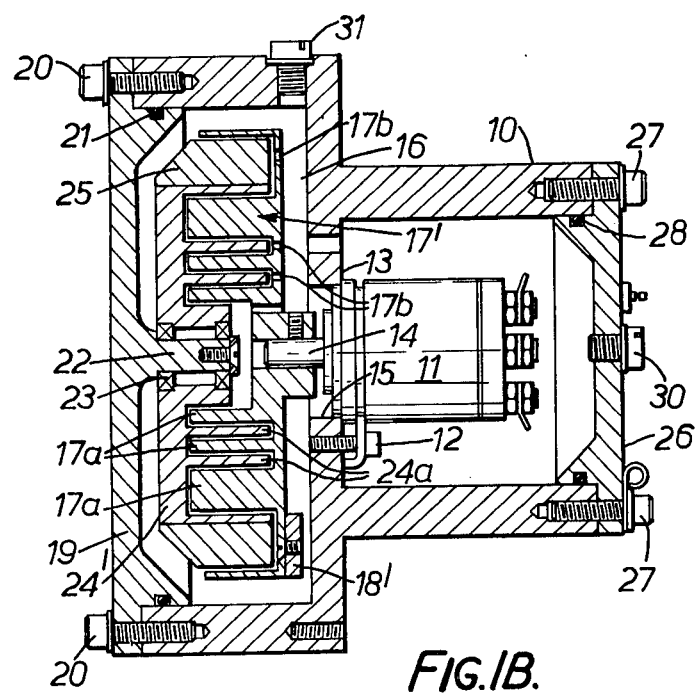
FIG. 1B is a side sectional view of an alternative positional sensor.

Referring now to FIG. 1B there is shown an alternative positional sensor which is similar to the sensor of FIG. 1A. In this sensor the pendulum 17' extends around the radially outer surface of weight 25 so as to increase the viscous coupling between wheel 24' and the pendulum. In addition the open ends of pendulum 17' and wheel 24' are formed with cylindrical portions 17a and 24a respectively, which are coaxial with shaft 14 and which interfit so as to increase the viscous coupling between pendulum 17' and wheel 24'. The clearance spaces between each portion 17a and adjacent portion 24a is of the order often to fifteen thousandths of an inch. The weight 18' for pendulum 17' is in the form of a heavy disc located on the rear of the closed end of pendulum 17'. In addition in this embodiment the member 29 may be omitted and a small amount, e.g. 12 cc of a total of 200 cc., of fluid removed, to allow for temperature expansion, after filling. This also further reduces the viscous couple between the pendulum and the case and provides a measure of compensation for fluid viscosity variation with temperature. Bleed holes 17b are provided in the upper half of pendulum 17' to prevent air locks when filling with damping fluid.

The sensor of FIG. 1B operates in similar manner to that described for FIG. 1A.

A suitable sensing device for sensor 11 is commercially available from the Sperry Gyroscope Division of Sperry Rand Limited, as Sperry Part No. 21142-0.

Figure 2:
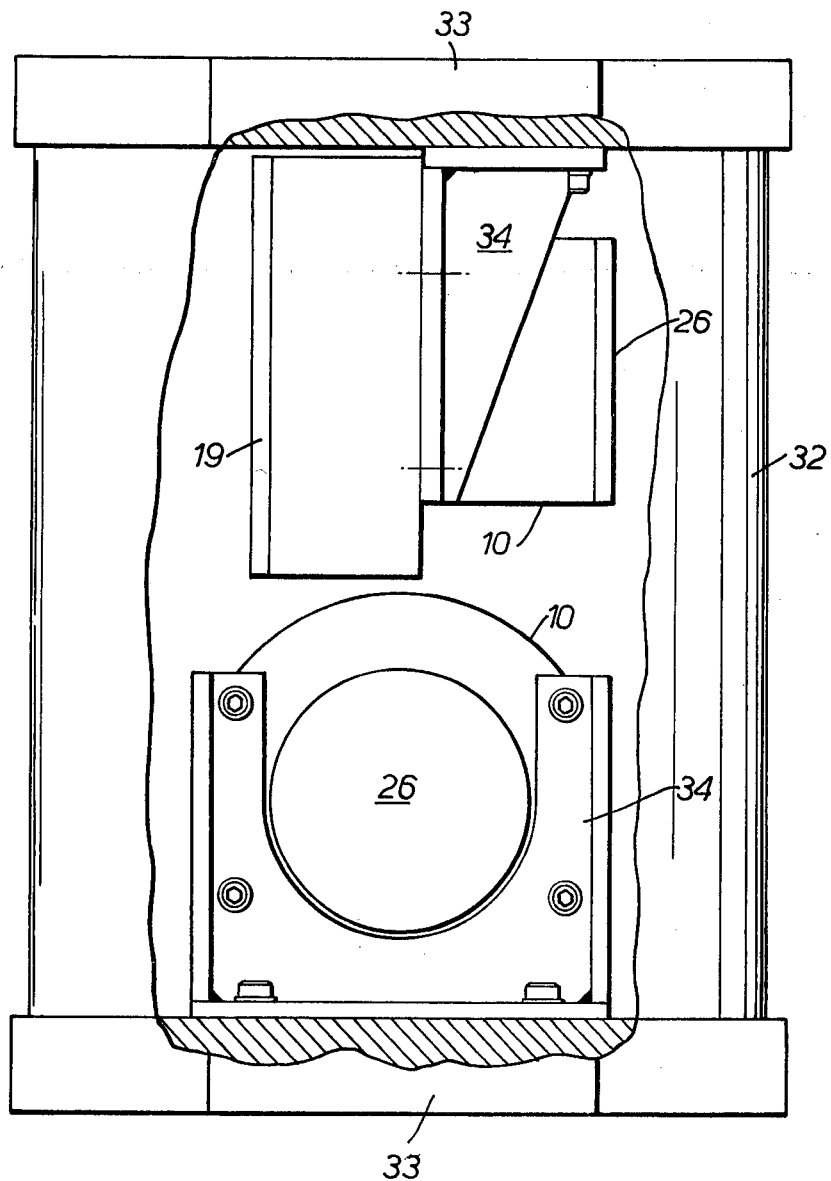
FIG. 2 is a side elevational view, part in section of a positional sensing module including two sensors as shown in FIG. 1A or FIG. 1B.

Referring now to FIG. 2 there is shown a positional sensing module comprising a cylindrical casing 32 with octagonal end caps 33 attached and sealed thereto. A separate sensor as shown in FIG. 1A or 1B is attached by a respective bracket 34 to the interior surface of each end cap 33. The operational axes of the two sensors (i.e. the longitudinal axes of shafts 14 of devices 11) are arranged normal to one another to provide signals representative of a deflection from vertical of casing 32 in any direction. The casing 32 is also filled with a silicone oil and a member (not shown) similar to member 29 of FIG. 1A is also located in casing 32.

Figure 3:
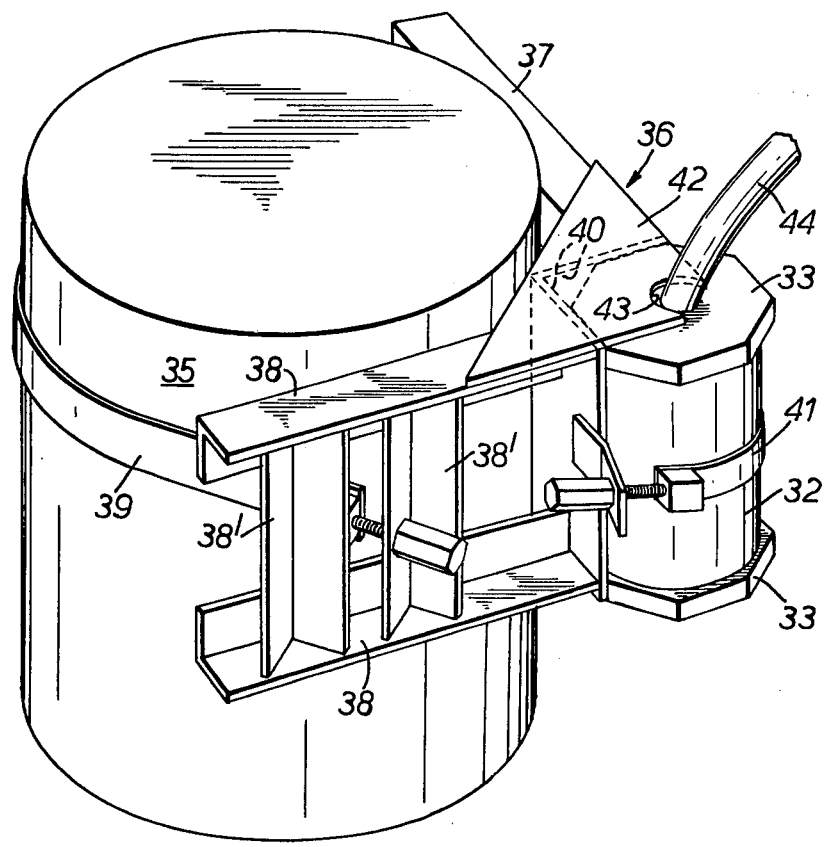
FIG. 3 is a diagrammatic perspective view of a sending module as shown in FIG. 2 located in position on a riser.

Referring now to FIG. 3, a sensing module as shown in FIG. 2 is shown attached to a riser 35 by way of a bracket 36 having two pairs of arms 37, 38 with respective cross members 38'. The bracket 36 is attached to the riser 35 by a tensioned strap 39 having its ends associated with respective cross members 38'. The bracket 36 further includes two angled faces 40 into contact with which corresponding faces of the octagonal end caps 33 of the casing 32 are drawn by tensioning a strap 41 which has a quick-release device (not shown) intermediate its ends. The bracket 36 is attached at a specific position on the riser 35 using a location reference (not shown) which may be an hydraulic line, for example, extending generally parallel to, and alongside, the riser. With this specific positioning of the bracket 36 on the riser 35 and, in turn, the positioning of the module on the bracket, the operational axes of the two sensors of the module are oriented in the desired manner relative to the corresponding axes of the riser 35 which latter axes are referenced to the meridian or other datum. The upper end cap 33 fits under a corner plate 42 of the bracket 36, the corner plate having a notch or recess 43 formed therein to accommodate the sensor cables 44 which enter the module through the upper end cap. Thus, it is not possible incorrectly to orientate the module when offering it to the bracket 36 for attachment thereto by the strap 41.

The sensing module is attached to the riser 35 close to the usual flexible or ball joint provided at the point where the riser is attached to the blow-off-preventer (BOP) stack (not shown). Another module is attached to the top of the BOP stack in a manner similar to that described and such that the operational axes of that module are oriented in the same way as those of the riser module.

Figure 4:
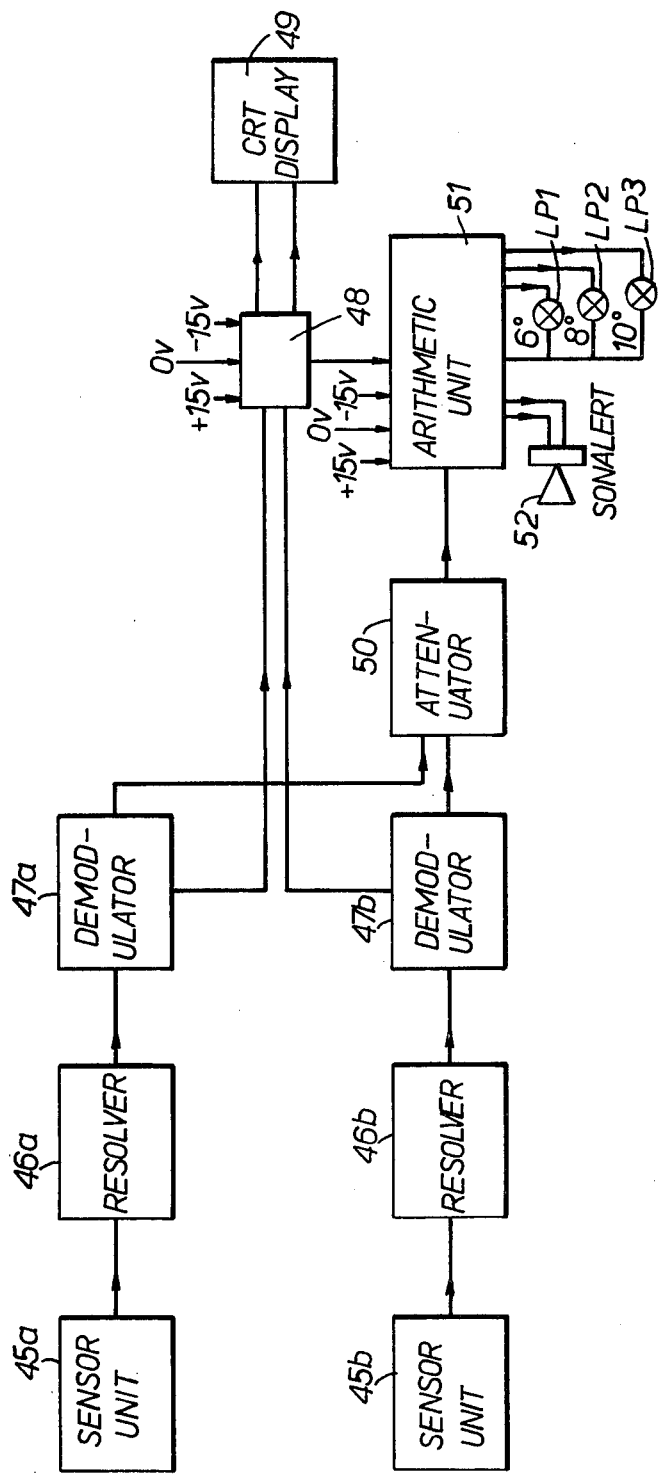
FIG. 4 is a block schematic diagram of a positional sensing system.

Referring now to FIG. 4 the outputs from the two sensor modules or units 45a and 45b comprising A.C. signals representative of an angle are fed to respective resolvers 46a and 46b which align the sensor signals, i.e. they orient in azimuth the sensor signals with respect either to a geographic reference or a heading reference. The A.C. outputs from the resolvers 46a and 46b are fed to respective demodulators 47a and 47b. The outputs from the demodulators 47a and 47b are in terms of Cartesian co-ordinates and are fed to a cathode ray tube control device 48 in which the signals from the respective sensor devices are subtracted and fed to a cathode ray tube display 49.

The outputs from demodulators 47a and 47b are also fed via an attenuator 50 into an arithmetic unit 51 which functions first to convert the inputs thereto from Cartesian to polar co-ordinates, then to subtract one sensor unit angle from the other sensor unit angle, and then to compare the final angle with predetermined reference angles. The reference angles are derived from a frequency divider (not shown) and if the measured angle exceeds a lowest predetermined angle (e.g. 6°) then a lamp LP1 is illuminated and a Sonalert 52 sounded with a low frequency "bleep". Should the measured angle increase to a second predetermined angle (e.g. 8°) then lamp LP2 is illuminated and the frequency of the "bleep" from Sonalert 52 increased. Should the measured angle increase to a further predetermined angle (e.g. 10°) then lamp LP3 is illuminated and the output from Sonalert is changed to a continuous note.

The angle resolvers 46a and 46b not only allow the apparent sensor axes to be rotated in azimuth to permit alignment to the meridian or other riser datum, but also relative to each other as between the riser module and BOP stack module to allow for variations in the mounting thereof.

Alternative applications of the present invention are to the control loop of a dynamic ship positioning system as the main or back-up term, to a pitch and roll sensor for a vessel, to an oil drilling rig to sense its inclination when being tilted from a towed position to an operative position, and for monitoring the angle of inclination of a wire from which a dredger bucket is suspended.

What is claimed is:
1. An angular positional sensor comprising:
   a. a housing;
   b. a rotary sensing device, the rotary sensing device having a freely rotatable shaft and being mounted in the housing, said sensing device being operative to produce a signal representative of the relative angular movement between the device and said shaft;
   c. a pendulum, the pendulum being mounted on the shaft of the rotary sensing device in the housing and having low inertia;
   d. a balanced member, the balanced member having high inertia relative to said pendulum inertia and being rotatably mounted within the housing adjacent the pendulum;
   e. a liquid, the liquid being contained in at least the part of the housing containing the pendulum and the balanced member to provide a viscous coupling between the pendulum and the balanced member, the arrangement being such, that in use, angular movement of the housing about the longitudinal axis of the shaft causes movement of the rotary sensing device relative to the shaft which is retained stationary by the pendulum which in turn is damped by the balanced member, whereby a signal representative of such angular movement is produced by the rotary sensing device.

2. An angular positional sensor as claimed in claim 1 wherein the ratio of the inertia of the balanced member to the inertia of the pendulum is in the order of 40:1.

3. An angular positional sensor as claimed in claim 1 wherein the pendulosity of the pendulum is fifty gram centimeters minimum.

4. An angular positional sensor as claimed in claim 1, wherein the pendulum is cylindrical and has a closed end by which it is mounted coaxially on the shaft of the rotary sensing device with a weight being attached thereto.

5. An angular positional sensor as claimed in claim 4 wherein the balanced member is also cylindrical, having a closed end by which it is mounted coaxially with the pendulum and the shaft of the rotary sensing device, the open end of the balanced member interfitting with the open end of the pendulum.

6. An angular positional sensor as claimed in claim 5 wherein the open ends of the pendulum and balanced members each have, coaxial with said shaft, cylindrical formations which are interfitting to increase the viscous coupling between the pendulum and balanced member.

7. An angular positional sensor as claimed in claim 1 wherein the part of the housing containing the pendulum and balanced member is substantially filled with liquid.

8. An angular positional sensor as claimed in claim 7 wherein the ratio of the spacing between the radially outer surface of the balanced member and a surrounding inner surface of the housing, on the one hand, and between the radially inner surface of the balanced member and the radially outer surface of the pendulum, on the other hand, is of the order of at least 12:1.

9. An angular positional sensor as claimed in claim 1 wherein the housing is substantially filled with liquid with a member of closed cell, cellular synthetic plastics material also located in the housing to facilitate expansion of the liquid with increase of temperature.

10. An angular positional sensor as claimed in claim 1 wherein said liquid comprises a silicone oil.

11. An angular positional sensor as claimed in claim 1 wherein the rotary sensing device comprises a rotary A.C. inductive pick-off.

12. An angular positional sensor as claimed in claim 1, further comprising an outer casing containing said sensor and a second angular positional sensor, said two sensors being located within the outer casing with the axes of rotation of said shafts normal to one another, thereby forming a positional sensor module.

13. A positional sensing module as claimed in claim 12 wherein the outer casing is substantially filled with liquid, with a member of closed cell, cellular synthetic plastics material also located in the casing to facilitate expansion of the liquid with increase of temperature.

14. A positional sensing module as claimed in claim 13 wherein said liquid is silicone oil and said cellular synthetic plastics material is neoprene.

15. An angular positional sensing system comprising at least two positional sensing modules as claimed in claim 12 each connected via respective resolvers and demodulators to indicating means.

16. An angular positional sensing system as claimed in claim 15 wherein said indicator means comprises a cathode ray tube display device.

17. An angular positional sensing system as claimed in claim 15 wherein the demodulators are connected via an attenuator and an arithmetic unit for operating at least one warming device.

* * * * *

UNITED STATES PATENT AND TRADEMARK OFFICE
CERTIFICATE OF CORRECTION

PATENT NO. : 4,027,399
DATED : June 7, 1977
INVENTOR(S) : Robert J. Armstrong et al.

It is certified that error appears in the above–identified patent and that said Letters Patent are hereby corrected as shown below:

Claim 17, Col. 6, line 67, delete "warming" and insert --warning--.

Signed and Sealed this

Eleventh Day of October 1977

[SEAL]

Attest:

RUTH C. MASON
Attesting Officer

LUTRELLE F. PARKER
Acting Commissioner of Patents and Trademarks